Feb. 17, 1925.

B. M. BROWNELL 1,526,959

FLEXIBLE PIPE JOINT

Filed Jan. 9, 1924

INVENTOR.
Barnett Morse Brownell,

HIS ATTORNEYS.

Patented Feb. 17, 1925.

1,526,959

UNITED STATES PATENT OFFICE.

BARNETT MORSE BROWNELL, OF ST. LOUIS, MISSOURI, ASSIGNOR TO DIAMOND METAL PRODUCTS CO., OF ST. LOUIS, MISSOURI, A CORPORATION OF MISSOURI.

FLEXIBLE PIPE JOINT.

Application filed January 9, 1924. Serial No. 685,107.

*To all whom it may concern:*

Be it known that I, BARNETT MORSE BROWNELL, a citizen of the United States, residing at St. Louis, Missouri, have invented a new and useful Flexible Pipe Joint, of which the following is a specification.

This invention relates to improvements in flexible pipe joints, and consists in the novel construction hereinafter disclosed.

An object of the invention is to provide in a flexible pipe joint, comprising a socket and ball member, an improved form of gasket with a seat therefor so arranged that the fluid pressure passing through the joint will force the gasket into tight relationship with the relatively movable parts of the joint in such a way as to form a fluid tight seal for the joint.

Another object of the invention is to provide a complete metallic support for the ball section of the joint, so that the gasket will be left free to function as a sealing element, together with improved means for mounting the gasket in relationship with the ball and socket members to form a tight seal.

The improved features of the invention will be apparent from the following detailed description thereof, taken in connection with the accompanying drawing in which—

Figure 1:
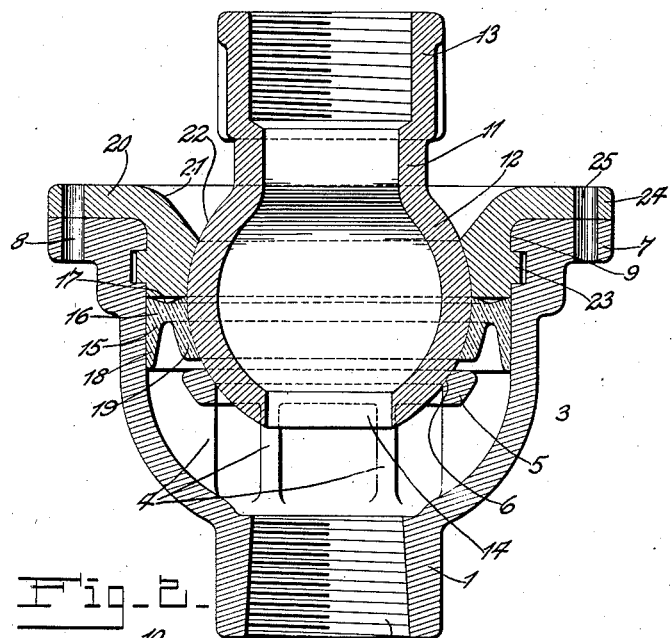
Fig. 1 is a vertical section through the joint.
Figure 2:
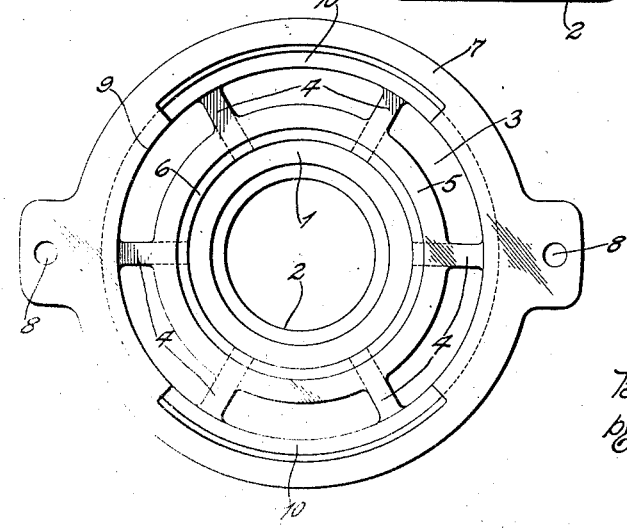
Fig. 2 is a plan view with the retaining member removed, showing the means of adjusting the retaining member in relationship with the ball portion and with the gasket.

In the embodiment of the invention illustrated in the drawing the socket member 1 is shown as formed from a casting, said member having a threaded throat 2 and a bell shaped portion 3 provided with internal ribs 4, said ribs extending radially from the wall of the member 1 inwardly. The ribs integrally support a ring member 5, said ring member constituting the lower support for the ball section of the joint, the edge 6 of the ring 5 being beveled to conform to the surface of the ball section. It will be understood that the member 1 is preferably made of a casting of any suitable metal such as bronze, malleable iron, or the like. The member 3 is formed with lugs 7 extending outwardly from the upper portion of the member 1, said lugs having openings 8 therein for the reception of a retaining device for locking the cap member of the coupling in position.

Within the upper throat of the member 1 is a channel 9 that extends around the throat near the upper edge of the member 1. At oppositely disposed points the upper wall of the channel 9 is cut out forming segmental recesses 10 to receive flanges formed on the cap member for locking the cap in position as will be understood from the explanation hereafter.

The ball member of the joint comprises a casting 11 having a spherical portion 12 and an interiorly threaded throat portion 13 for the reception of a pipe section of the pipe line. The spherical portion of the member 11 has an opening 14 to provide communication with the member 1. The ball section 11 is mounted within the member 1, the lower wall of the spherical portion thereof resting on the ring 5 and making complete annular contact with the beveled portion 6 of said ring.

A gasket 15 of flexible material, such as semi-hard rubber, is provided as a sealing element of the joint. This gasket comprises a ring section 16, the upper wall of which is formed with a concave surface 17. Downwardly extending from the lower portion of the ring 16 are diverging walls 18 and 19, the wall 18 being of a greater length than the wall 19 and designed to fit tightly against the adjacent surface of the socket section. The wall 19 is curved to conform to the surface of the ball section.

A cap member serving as an upper bearing for the ball section and also as a retaining means for the gasket is provided. Said cap member comprises a casting 20 having a dished upper surface 21 and an internal wall 22 that bears against the surface of the ball section, being complementarily formed in respect of the surface of said ball section so that it provides a complete annular support for the ball section. The cap member is provided with segmental flanges 23 and lugs 24. In assembling the cap section the segmental flanges 23 are seated in the recesses 10 and the cap then given a 90° turn that locks the flanges 23 within the channel 9, and pins 25 or other retaining devices are inserted in the openings in the lugs 7 and 24.

It will be noted that when the coupling is assembled it is supported between the ribs 4 and the lower face of the cap member 20, the lower edge of the wall 18 resting upon the ribs and the upper face 17 of the gasket matching with the horizontal face of the adjacent portion of the cap member. This permits the wall 19 to freely move against the surface of the ball section when fluid pressure is introduced into the coupling. The fluid pressure also presses the gasket upwardly against the lower face of the cap member and, inasmuch as the upper face of the gasket is concave, it will force the upper edges of the gasket outwardly to tightly seal the joints between the cap member and the ball member and also between the cap member and the socket member.

As the ball section is entirely supported by the bearings constituting the ring 5 and the contacting surface of the cap member, the gasket is left free to function as a sealing device and is also relieved from any frictional wear.

I am aware that the invention may be modified in various particulars without departing from the spirit and scope thereof. I do not limit myself unessentially, but what I claim and desire to secure by Letters Patent is:—

1. A flexible pipe coupling comprising a socket member and a ball member, said ball member fitting within said socket member, internal ribs on the socket member, a ring supported by the ribs and constituting an annular bearing for the ball member, a cap member formed for interlocking connection with the socket member, said cap member having bearing portions for the ball member and having a flat lower face for retaining a gasket, a gasket mounted between the bearing portions for the ball member and having a concave upper wall contacting with the cap member, and depending walls arranged to contact respectively with the surfaces of the ball member and the socket member.

2. A flexible pipe coupling comprising a bell-shaped socket member having oppositely disposed recesses and channels in its upper interior portion, an annular bearing portion supported within the lower part of the socket member, a ball member mounted within the socket member, said ball member seating on the bearing formed within the socket member, a cap member having segmental flanges arranged to lock within the recesses and channels formed in the socket member and having a bearing portion contacting with the ball member, and an annular gasket carried between the bearings for the ball member and comprising spaced walls adapted to contact with the surfaces of the ball and socket members respectively and having a recessed upper wall matching the face of the cap member, whereby when pressure is admitted to the coupling the gasket is wedged outwardly to seal the joints between the cap member and the ball and socket members, respectively.

3. A flexible pipe coupling comprising a bell-shaped socket member having oppositely disposed recesses and channels in its upper interior portion, an annular bearing portion supported within the lower part of the socket member, a ball member mounted within the socket member, said ball member seating on the bearing formed within the socket member, a cap member having segmental flanges arranged to lock within the recesses and channels formed in the socket member and having a bearing portion contacting with the ball member, an annular gasket carried between the bearings for the ball member and comprising spaced walls adapted to contact with the surfaces of the ball and socket members respectively and having a recessed upper wall matching the face of the cap member, whereby when pressure is admitted to the coupling the gasket is wedged outwardly to seal the joints between the cap member and the ball and socket members, respectively, and retaining means between the cap member and the socket member for locking the same in assembled relationship.

4. A pipe coupling comprising a socket member and a ball member, a support for the lower part of the ball member spaced from the wall of the socket member, a support for the upper part of the ball member having a lower flat surface, and a gasket between the socket member and the ball member having a concave surface contacting with the flat surface of the upper support for the ball member.

5. A pipe coupling comprising a socket member and a ball member, a support for the lower part of the ball member spaced from the wall of the socket member, a cap connected with the socket member and having a surface for supporting the upper part of the ball member, said cap also having a flat lower surface, a gasket between the socket member and the ball member and having a concave surface contacting with the flat surface of the cap, and means for locking the cap in connection with the socket member.

BARNETT MORSE BROWNELL.